United States Patent [19]

Martl et al.

[11] Patent Number: 5,684,116
[45] Date of Patent: Nov. 4, 1997

[54] TITANIUM DIOXIDE/SILICON DIOXIDE COPRECIPITATES AND TITANIUM DIOXIDE/ZIRCONIUM DIOXIDE COPRECIPITATES AS POLYCONDENSATION CATALYSTS FOR POLYESTERS AND COPOLYESTERS

[75] Inventors: Michael Martl, Obernburg; Thomas Mezger, Erlenbach; Gerriet Oberlein, Obernburg; Klaus Haferland; Bertram Böhringer, both of Wuppertal; Ulrich Berger, Heinsberg, all of Germany

[73] Assignee: Akzo Nobel, N.V., Arnhem, Netherlands

[21] Appl. No.: 669,363

[22] PCT Filed: Jan. 2, 1995

[86] PCT No.: PCT/EP94/04333

§ 371 Date: Jul. 5, 1996

§ 102(e) Date: Jul. 5, 1996

[87] PCT Pub. No.: WO95/18839

PCT Pub. Date: Jul. 13, 1995

[30] Foreign Application Priority Data

Jan. 7, 1994 [DE] Germany ................... 44 00 300.5

[51] Int. Cl.⁶ .................................................. C08G 63/00
[52] U.S. Cl. .................. 528/176; 502/100; 502/309; 502/349; 502/350; 528/190; 528/191; 528/193; 528/194
[58] Field of Search ................... 528/176, 190, 528/191, 193, 194; 502/100, 349, 350, 309

[56] References Cited

U.S. PATENT DOCUMENTS

| | | | |
|---|---|---|---|
| 2,906,737 | 9/1959 | York, Jr. .................. | 528/176 |
| 3,023,192 | 2/1962 | Shivers, Jr. ............... | 528/181 |
| 4,421,908 | 12/1983 | East ......................... | 528/181 |

FOREIGN PATENT DOCUMENTS

| | | |
|---|---|---|
| 692527 | 6/1967 | Belgium. |
| 55945 | 3/1939 | Denmark. |
| 051220-A1 | 5/1982 | European Pat. Off.. |
| 109123-A1 | 5/1984 | European Pat. Off.. |
| 472366-A2 | 2/1992 | European Pat. Off.. |
| 496404-A1 | 7/1992 | European Pat. Off.. |
| 1165359 | 10/1958 | France. |
| 1435758 | 3/1966 | France. |
| 1435758 | 6/1966 | France. |
| 1509306 | 12/1967 | France. |
| 2570077 | 3/1986 | France. |
| 2570077-A1 | 3/1986 | France. |
| 2352584 | 5/1974 | Germany. |
| 44 00 300 | 7/1995 | Germany. |
| 48-41949 | 6/1973 | Japan. |
| 49-11474 | 3/1974 | Japan. |
| 52-86496 | 7/1977 | Japan. |
| 53-106792 | 9/1978 | Japan. |
| 53-109597 | 9/1978 | Japan. |
| 55-23196 | 2/1980 | Japan. |
| 682866 | 11/1952 | United Kingdom. |
| 1037256 | 7/1966 | United Kingdom. |

OTHER PUBLICATIONS

Derwent abstract JP 48041949.

Eric A. Barringer et al., *Formation, Packing, and Sintering of Monodisperse TiO₂ Powders*, Dec. 1982, Communications of the American Ceramic Society, pp. C–199 to C–201.

*Primary Examiner*—Terressa Mosley
*Attorney, Agent, or Firm*—Oliff & Berridge

[57] ABSTRACT

For the preparation of polyesters and copolyesters, titanium dioxide/silicon dioxide coprecipitates having a composition of $TiO_2:SiO_2=90:10$ to 20:80 mol/mol and/or titanium dioxide/zirconium dioxide coprecipitates having a composition of $TiO_2 : ZrO_2=95:5$ to 70:30 mol/mol are proposed as polycondensation catalysts. They have a higher catalytic activity than $Sb_2O_3$, so that the preferred amount used is only 10 to 100 ppm, based on the esters or oligoesters to be subjected to polycondensation.

14 Claims, No Drawings

TITANIUM DIOXIDE/SILICON DIOXIDE COPRECIPITATES AND TITANIUM DIOXIDE/ZIRCONIUM DIOXIDE COPRECIPITATES AS POLYCONDENSATION CATALYSTS FOR POLYESTERS AND COPOLYESTERS

BACKGROUND

Polyesters and copolyesters are in general prepared by a two-stage process, regardless of their structure, which can extend from aliphatic to completely aromatic via numerous possible variations. In the first stage, in particular, dicarboxylic acid esters are transesterified or dicarboxylic acids are esterified with excess dialcohols to prepare the esters to be subjected to polycondensation or a polyester precondensate which comprises a mixture of oligoesters and can have an average relative molecular weight, depending on the molar ratio of the starting compounds, of as a rule between 100 and 2000. Limited amounts of starting components of higher functionality, such as glycerol, pentaerythritol and trimellitic acid, can also be employed for any desired branching modification. Equivalent procedures for the first stage are the reaction of dicarboxylic acid chlorides with diols, the addition of ethylene oxide onto dicarboxylic acids, the esterification of an anhydride with a dialcohol, the reaction of anhydrides with epoxides and the reaction of dicarboxylic acids or dicarboxylic acid esters with the diacetate of a diol. The second reaction stage is the actual polycondensation, in which the desired high molecular weight of the polyesters or copolyesters must be achieved, alcohol and/or water being split off. As well as applying vacuum, passing through an inert gas and increasing the reaction temperature, the polycondensation is accelerated, in particular, by specific polycondensation catalysts.

A legion of polycondensation catalysts for acceleration of the polycondensation reaction has already been proposed for the preparation of film- and fibre-forming polyesters. Since the overwhelming majority of compounds mentioned in numerous patents have an inadequate catalytic activity or other disadvantages, almost exclusively $Sb_2O_3$ has become accepted as the polycondensation catalyst in the art. Unfortunately, this catalyst has recently met objections in terms of environmental policy, so that its replacement generally seems desirable.

Attempts are continuously being made to provide substitute catalysts for $Sb_2O_3$. In particular, alkoxy titanates, specifically tetrabutyl titanate, have already been proposed, these compounds being used either only for the transesterification (JA Patent 74 11 474), for the transesterification and polycondensation (JA-A 77 86 496) or only for the polycondensation (JA-A 80 23 196), since they are catalytically active for both stages. Since the use of titanium compounds causes discolorations in the polycondensed polyesters, according to JA-A 78 106 792, it is necessary to pretreat titanium compounds with various organic substances, for example amines, or to combine them with other polycondensation catalysts, in particular with $Sb_2O_3$ (JA-A 78 109 597).

SUMMARY OF THE INVENTION

The object of the present invention is to provide, for the general synthesis of polyesters and copolyesters, new polycondensation catalysts as a replacement for $Sb_2O_3$ which offer increased safety for the ecosystem and are distinguished in particular by a higher catalytic activity than $Sb_2O_3$ and titanium tetrabutylate have, in each case in the same concentration.

The invention relates to a process for the preparation of polyesters and copolyesters by polycondensation of polyester-forming starting components, esters or oligoesters being prepared in a first reaction stage and subjected to polycondensation in a second reaction stage in the presence of titanium catalysts, which is characterized in that, in the polycondensation stage, a titanium dioxide/silicon dioxide coprecipitate having a composition of $TiO_2:SiO_2=90:10$ to 20:80 mol/mol and/or a titanium dioxide/zirconium dioxide coprecipitate having a composition of $TiO_2:ZrO_2=95:5$ to 70:30 mol/mol is employed as the polycondensation catalyst for polycondensation of the esters or oligoesters.

DESCRIPTION OF PREFERRED EMBODIMENTS

On the basis of the fact that $TiO_2$ is a poor polycondensation catalyst for the synthesis of polyesters (cf. Comparison Examples 1a and 1b), it is surprising that titanium dioxide/silicon dioxide coprecipitates and titanium dioxide/zirconium dioxide coprecipitates are highly active polycondensation catalysts at all, in particular for the preparation of thread-forming high molecular weight polyesters and copolyesters, and moreover only in the particular specific composition ranges mentioned.

For the use according to the invention as a polycondensation catalyst, a composition of $TiO_2:SiO_2$ of 90:10 to 50:50 mol/mol is preferred in the case of the titanium dioxide/silicon dioxide coprecipitates and a composition of $TiO_2:ZrO_2$ of 90:10 to 80:20 mol/mol is preferred in the case of titanium dioxide/zirconium dioxide precipitates. A titanium dioxide/silicon dioxide coprecipitate from the required composition range, like a corresponding titanium dioxide/zirconium dioxide precipitate, can be employed as the polycondensation catalyst by itself or as a mixture with the other particular type of coprecipitate or as a mixture with its own type having a different composition within the required composition ranges.

The preparation of amorphous $TiO_2/SiO_2$ coprecipitates and $TiO_2/ZrO_2$ coprecipitates has been known per se for a long time (E. A. Barringer et al., J. Am. Ceramic Soc. 65 (1982), C-199). The possibility of preparing such coprecipitates is based in principle on the fact that, when water is added to an ethanolic solution of tetraethoxysilane, a silanol of the formula $(RO)_3SiOH$ is first formed, that is to say one OR group of the tetraethoxysilane is replaced by an OH group according to equation (1):

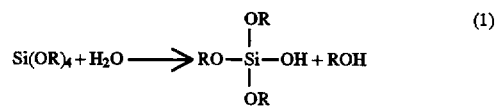

(1)

If the excess of water is not too high, self-condensation of the silanol can indeed take place in accordance with equation (2):

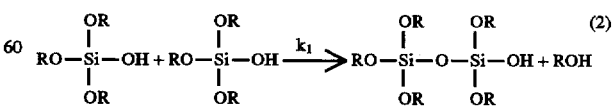

(2)

If titanium(IV) tetraalcoholates or zirconium(IV) tetraalcoholates are present, however, condensation of these compounds with the silanol formed according to (1) preferentially occurs:

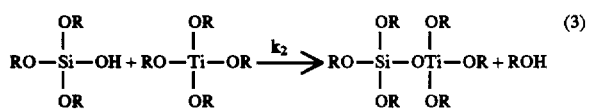

(3)

The reaction according to (3) thus proceeds very much more quickly than the self-condensation of the silanol according to (2) ($k_2 \gg k_1$), and Si—O—Ti units or Si—O—Zr units therefore preferentially form.

An adequate excess of water from further addition of water leads, by condensation and hydrolysis, to mixed oxides having alternating Si—O—Ti—O— or Si—O—Zr—O— bonds with virtually complete replacement of the hydroxyl and alcohol groups. Under optimum hydrolysis conditions, the mixed oxides are obtained in the form of finely divided particles having a primary particle size of <1 μm and a very narrow particle size distribution. Because of their surface charges, these particles repel each other, so that no agglomeration occurs. An advantageous form of the preparation of the titanium dioxide/silicon dioxide coprecipitates and titanium dioxide/zirconium dioxide coprecipitates used according to the invention which is carried out at room temperature is described in Examples 1 to 3 in the experimental section. Under the hydrolytic conditions described there, gel formation, which is to be avoided, is excluded and homogeneous precipitation of the Ti/Si or Ti/Zr mixed oxides takes place.

In addition to the Examples 1 to 3 just mentioned, it should be mentioned that catalytically active coprecipitates are of course also obtained if, instead of the titanium(IV) tetraisopropylate used there, other titanium compounds, for example titanium(IV) tetraethylate or titanium(IV) tetra-2-ethylhexylate, are employed as the starting substance. Different silicon or zirconium components can also be employed analogously. Likewise, instead of ethanol, it is also possible to employ other alcohols, such as methanol, propanol, isopropanol and glycol, as solvents. Monohydric and/or polyhydric alcohols having 1–6 or 2–6 C atoms are preferred here.

The amounts added of the coprecipitates according to the invention which are used as the polycondensation catalyst can be varied within wide limits and include a total amount of about 5 to 500 ppm, based on the esters or oligoesters to be subjected to polycondensation. Their upper limit can therefore in principle be of the same order of magnitude as in the case where $Sb_2O_3$ is used, which is as a rule employed as a polycondensation catalyst in an amount of about 300 to 400 ppm.

If attention must be paid to achieving good colour values for certain fields of use of the polyesters and copolyesters prepared, however, it is preferable to use the titanium dioxide/silicon dioxide coprecipitate and/or the titanium dioxide/zirconium dioxide coprecipitate in a total amount of only 10 to 100 ppm, based on the esters or oligoesters to be subjected to polycondensation. The increased catalytic activity of the coprecipitates used according to the invention allows the use of added amounts which are considerably lower than in the case where $Sb_2O_3$ is used, the same polycondensation time and a completely acceptable b* value of 3.0 to 8.0 then being achieved with the polyesters thus prepared. This b* value range corresponds in particular to the values which are likewise obtained in the preparation of polyethylene terephthalate using 400 ppm of $Sb_2O_3$ as the polycondensation catalyst. The titanium dioxide/silicon dioxide and titanium dioxide/zirconium dioxide coprecipitates used according to the invention are preferably added in the form of a 5 to 20% strength suspension in glycol to the esters or oligoesters synthesized in the first reaction stage, for example the hisglycol ester of the dicarboxylic acid(s) to be subjected to polycondensation and/or the precondensate of one or more such hisglycol esters, before their polycondensation. However, it is in principle also possible for the coprecipitates even to be added at any point in time during the first reaction stage, and in the case of transesterification, if appropriate together with one or more transesterification catalysts. In the case of transesterification in the first reaction stage, it may sometimes be advantageous to block the transesterification catalysts after the transesterification by addition of phosphorus compounds in a manner known per se. Suitable phosphorus compounds are, for example, carbethoxy-methyl-diethyl phosphonate, di(polyoxyethylene)hydroxymethyl phosphonate, tetraisopropyl methylene-diphosphonate and $H_3PO_4$, an added P concentration of 30–50 ppm in general being adequate.

Under customary reaction conditions, the coprecipitates used according to the invention are in principle suitable as polycondensation catalysts for the preparation of the most diverse polyesters and copolyesters for which $Sb_2O_3$ has been employed to date as the polycondensation catalyst, if appropriate also in combination with one or more other polycondensation catalysts. The most diverse fields of use also correspond to the various types of polyesters and copolyesters.

If alkyd resins and saturated polyester resins (hydroxypolyesters) having a relative molecular weight of <10,000 are prepared with the coprecipitates used according to the invention, these can be used as binders in varnishes and paints. In modern usage, alkyd resins here are understood as meaning oil- or fatty acid- modified polyesters of polycarboxylic acids and polyalcohols and reaction products thereof with, for example, vinyl compounds, epoxy resins, silicones, diisocyanatesn and organometallic compounds ("modified" alkyd resins). Polycarboxylic acids which are employed for alkyd resins are essentially phthalic acid, isophthalic acid, malonic acid, succinic acid, adipic acid, azelaic acid, sebacic acid, dodecanedioic acid, dimerized fatty acids, hexahydrophthalic acid, hexahydroterephthalic acid, maleic acid, fumaric acid and, for the purpose of flameproofing, halogen-containing dicarboxylic acids, such as tetra-chlorophthalic anhydride. Polyols which are used are in general glycerol, pentaerythritol, dipentaerythritol, trimethylolpropane, trimethylolethane, sorbitol and difunctional polyols, such as ethylene glycol, propylene 1,2-glycol, butane-1,3- and -1,4-diol, diethylene glycol, dipropylene glycol and neopentylglycol. The third component for the preparation of alkyd resins are long-chain fatty acids, either synthetic fatty acids, such as pelargonic acid, abietic acid and synthetic fatty acid mixtures ($C_7$–$C_9$), or naturally occurring fatty acids, which are used almost exclusively in the form of their fats and oils, for example linseed oil, castor oil, coconut oil, soya oil and cottonseed oil. In contrast, no longer-chain fatty acids are employed in the polycondensation for the preparation of saturated polyester resins, which are defined in DIN 55 945, while otherwise the saturated polycarboxylic acids and polyalcohols used are essentially the same as those employed for the preparation of alkyd resins.

If (co)polyesters are synthesized as precursors for polyurethanes having a relative molecular weight of <10,000 using the coprecipitates in question, this leads, depending on their further processing on the basis of known procedures, not only to polyurethane varnishes, but also to a diversity of different types of plastics having variable useful use properties (thermosets, thermoplastics, casting elastomers, rigid and flexible foams, compression moulding compositions, rigid and flexible coatings, adhesives).

The low molecular weight polyesters and copolyesters as precursors for polyurethanes are in general prepared from saturated aliphatic or aromatic dicarboxylic acids and difunctional or di- and trifunctional alcohols and are linear or slightly to severely branched. With the coprecipitates used according to the invention, it is possible to prepare the entire wide range of hydroxy-polyesters known for this, having hydroxyl numbers of 28–300 mg of KOH/g and acid numbers of usually less than 1 mg of KOH/g. The highly branched polyesters among them, which are chiefly obtained on the basis of aromatic or hydroaromatic dicarboxylic acids, are used mainly as binders for polyurethane varnishes.

The coprecipitates used according to the invention are particularly suitable, under customary reaction conditions, as polycondensation catalysts for the preparation of the known high-melting fibre- and film-forming polyesters, such as polyethylene terephthalate, polybutylene terephthalate, poly(ethylene 2,6-naphthalene-dicarboxylate), Poly (butylene 2,6-naphthalene-dicarboxylate), poly(1,4-dimethylenecyclohexane terephthalate) and copolyesters thereof based on high homopolyester contents of at least 80 mol per cent, which belong to the class of thermoplastic polyesters. Such polyesters and copolyesters in principle have a molecular weight of >10,000. The polyalkylene terephthalates preferably subjected to polycondensation with the coprecipitates, in particular polyethylene terephthalate and polybutylene terephthalate, can, as copolyesters, comprise up to 20 mol per cent of units which are derived from at least one other polyester-forming component. Furthermore, it is of course of no significance for the use of the polycondensation catalysts according to the invention whether the bisglycol esters of the dicarboxylic acid(s) to be subjected to polycondensation and/or the precondensates of one or more such bisglycol esters have been prepared by a transesterification process or by a direct esterification process.

The polycondensation catalysts according to the invention are thus suitable both for the preparation of a fibre-forming polyethylene terephthalate having an intrinsic viscosity [λ] of 0.65–0.75, which as a rule is further processed to staple fibres for textile purposes, and for the preparation of fibre-forming polyethylene terephthalates having an intrinsic viscosity [λ] of 0.75–0.80 and 0.95–1.05, from which filament yarns are prepared for industrial purposes. The increased molecular weights can be achieved by continuous polycondensation with direct spinning or, preferably, by post-condensation in the solid phase. For post-condensation in the solid phase, it is advantageous to block any transesterification catalysts present by phosphorus compounds in a manner known per se. Phosphorus compounds which are suitable for this are, for example, di(polyoxyethylene)-hydroxymethyl phosphonate, tetraisopropyl methylenediphosphonate and $H_3PO_4$, an added P concentration of 30–50 ppm being sufficient.

The fibre- and film-forming thermoplastic polyesters prepared with the polycondensation catalysts according to the invention, in particular polyethylene terephthalate and polybutylene terephthalate, can of course also be processed, for example, to all types of shaped articles and profiles by means of injection moulding and extrusion. For example, if a polyethylene terephthalate prepared with the polycondensation catalysts according to the invention is processed to PET bottles, these have a high transparency and a lower acetaldehyde content.

The other polyester-forming components for fibre- and film-forming copolyesters can be an aliphatic diol, such as ethylene glycol, propylene glycol, tetramethylene glycol, pentamethylene glycol, hexamethylene glycol, polyethylene glycol, polypropylene glycol and poly(tetrahydrofuran)diol, an aromatic diol, such as pyrocatechol, resorcinol and hydroquinone, an alicyclic diol, such as 1,4-cyclohexanedimethanol and cyclohexanediol, an aliphatic dicarboxylic acid, such as adipic acid, sebacic acid and decanedicarboxylic acid, an aromatic dicarboxylic acid, such as isophthalic acid, 5-sodium-sulphoisophthalic acid, sodium-sulphoterephthalic acid and 2,6-naphthalenedicarboxylic acid, and an alicyclic dicarboxylic acid, such as hexahydroterephthalic acid and 1,3-cyclohexanedicarboxylic acid. The analogous polyester-forming components for copolyester formation are also possible for the thread-forming homopolyesters, some of which are already mentioned above, which do not belong to the class of polyalkylene terephthalates.

The film- and fibre-forming polyesters can of course also comprise, as customary modifying agents, known branching agents, such as pentaerythritol, trimellitic acid, pyromellitic acid and trimesic acid or esters thereof, in the small amounts customary for this purpose of, for example, 1 to 15 microequivalents per g of polymer, these guaranteeing high-speed spinning at 3000 to 4000 m/min or more, and also draw-texturing at a rate of at least 1000 m/minute. These branching agents are advantageously added as a solution in ethylene glycol to the bisglycol ester of the dicarboxylic acid(s) to be subjected to polycondensation.

The term copolyester also includes the extensive class of polyether-esters. As is known, the thermoplastic polyether-esters are block copolymers which are synthesized from mutually incompatible rigid crystalline and flexible amorphous segments. The rigid and short-chain segments generally chiefly comprise an aromatic polyester, for example ethylene terephthalate units or butylene terephthalate units, while the flexible and long-chain segments comprise, in particular, the reaction product of an aliphatic polyether, for example poly (butylene glycol) or poly(ethylene glycol) with an aliphatic, cycloaliphatic or aromatic dicarboxylic acid. Both the long-chain and the short-chain ester units are often copolyesters which result from the limited co-use of one or more other dicarboxylic acid and glycol components. Thermoplastic polyether-esters, for the preparation of which the titanium dioxide/silicon dioxide and titanium dioxide/zirconium dioxide coprecipitates employed according to the invention as polycondensation catalysts are also suitable, are described, for example, in U.S. Pat. No. 3,023,192, GB-B 682 866, DE-C 23 52 584, EP-A-0 051 220 and EP-A-0 109 123.

The titanium dioxide/silicon dioxide and titanium dioxide/zirconium dioxide-coprecipitates used according to the invention are also suitable for the preparation of completely aromatic or liquid-crystalline polyesters if this is carried out on the basis of customary polycondensation catalysts, such as $Sb_2O_3$ and titanium alkoxides. Thus, for example, completely aromatic polyesters of 10–90 mol per cent of a hydroxy-naphthalene-carboxylic acid, 5–45 mol per cent of at least one other aromatic dicarboxylic acid, for example terephthalic acid, and 5–45 mol per cent of at least one aromatic diol, for example hydroquinone, are known from U.S. Pat. No. 4,421,908. According to EP-A-0 472 366, completely aromatic polyesters are prepared from (A) isophthalic acid, (B) hydroquinone and (C) from 4,4-dihydroxybiphenyl and/or p-hydroxybenzoic acid and/or 2-hydroxy-6-naphthalene-carboxylic acid and (D) a phenol. And EP-A-0 496 404 describes completely aromatic polyesters which are obtained by reaction of at least one dialkyl ester of an aromatic dicarboxylic acid, for example DMT, with at least one aromatic polycarbonate, for example poly (4,4'-isopropylidene-diphenylene carbonate) and/or an aromatic dialkyl dicarbonate. In these processes, mentioned by way of example, for the preparation of completely aromatic polyesters, the polycondensation catalysts used therein, such as $Sb_2O_3$, titanium alkoxides and zirconium alkoxides, can be replaced in an advantageous manner by the specific coprecipitates according to the invention, quite irrespective of whether they are added as early as in the first reaction stage or in the subsequent actual polycondensation stage.

The invention is illustrated in more detail with the aid of the following examples. The relative solution viscosity stated therein was measured at 25° C. as a 1% strength solution in m-cresol. The number of carboxyl groups has been stated as carboxyl group equivalents/$10^6$ g or mmol/kg of the polymer. This parameter was determined by titration of the polymer in o-cresol with potassium hydroxide.

The L* a* b* colour system was taken as the basis for evaluation of the colour of the polyesters. This is one of the colour systems for standardization of colour measurement and was recommended in 1976 by the CIE (Commission Internationale de l'Eclairage) because of its relatively high accuracy in describing perceptible colours and colour differences. In this system, L* is the lightness factor and a* and b* are colour measurement numbers. In the present case, the b* value, which indicates the yellow/blue balance, is important. A positive b* value means yellow discoloration and a negative b* value blue discoloration. Polyesters prepared conventionally with antimony trioxide have a b* value of between 3 and 8. Higher values are also accepted for products for which colour is not critical.

A

Preparation of the $TiO_2/SiO_2$ and $TiO_2/ZrO_2$ coprecipitates

EXAMPLE 1

Catalytically active titanium dioxide/silicon dioxide coprecipitate ($TiO_2$:$SiO_2$=90:10 mol/mol)

9.79 g of titanium(IV) tetraisopropylate (34 mmol) and 0.80 g of tetraethoxysilane (3.8 mmol) are dissolved with 100 ml of absolute ethanol (solution A). 10.27 g of distilled $H_2O$ (0.57 mol) are mixed with 100 ml of absolute ethanol (solution B). Solution A is initially introduced into the reaction vessel, and solution B is added dropwise at 22° C. in the course of 30 minutes. A white precipitate separates out. After the mixture has been stirred for 1 hour, it is centrifuged and the residue is washed 3 times with distilled $H_2O$. The product is dried at 70° C. in vacuo.

EXAMPLE 2

Catalytically active titanium dioxide/zirconium dioxide coprecipitate ($TiO_2$:$ZrO_2$=90:10 mol/mol)

25.58 g of titanium(IV) tetraisopropylate (0.09 mol) and 3.28 g of zirconium(IV) tetrapropylate (0.01 mol) are dissolved in 263 g of absolute ethanol (solution A). 27.02 g of distilled $H_2O$ (1.5 mol) are mixed with 263 g of absolute ethanol (solution B). Solution A is initially introduced into the reaction vessel, and solution B is added dropwise at 22° C. in the course of 30 minutes. A white precipitate separates out. After the mixture has been stirred for 1 hour, it is centrifuged. The residue is washed once with distilled $H_2O$ and then washed with ethanol and centrifuged for in each case 20 minutes. The product is dried at 60°–70° C. in vacuo for 24 hours.

EXAMPLE 3

Catalytically active titanium dioxide/zirconium dioxide coprecipitate ($TiO_2$:$ZrO_2$=80:20 mol/mol)

22.74 g of titanium(IV) tetraisopropylate (0.08 mol) and 6.56 g of zirconium(IV) tetrapropylate (0.02 mol) are dissolved in 263 g of absolute ethanol (solution A). 27.02 g of distilled $H_2O$ (1.5 mol) are mixed with 263 g of absolute ethanol (solution B). Solution A is initially introduced into the reaction vessel, and solution B is added dropwise at 22° C. in the course of 30 minutes. A white precipitate separates out. After the mixture has been stirred for 1 hour, it is centrifuged. The residue is washed once with distilled $H_2O$, and then washed with ethanol and centrifuged for in each case 20 minutes. The product is dried at 60°–70° C. in vacuo for 24 hours.

EXAMPLE 4

Catalytically inactive titanium dioxide/zirconium dioxide coprecipitate ($TiO_2$:$ZrO_2$=60:40 mol/mol)

17.05 g of titanium(IV) tetraisopropylate (0.06 mol) and 13.10 g of zirconium(IV) tetrapropylate (0.04 mol) are dissolved in 263 g of absolute ethanol (solution A). 27.02 g of distilled $H_2O$ (1.5 mol) are mixed with 263 g of absolute ethanol (solution B). Solution A is initially introduced into the reaction vessel, and solution B is added dropwise at 22° C. in the course of 30 minutes. A white precipitate separates out. After the mixture has been stirred for 1 hour, it is centrifuged. The residue is washed once with distilled $H_2O$, and is then washed with ethanol and centrifuged for in each case 20 minutes. The product is dried at 60°–70° C. in vacuo for 24 hours.

EXAMPLE 5

Catalytically inactive titanium dioxide/silicon dioxide coprecipitate ($TiO_2$:$SiO_2$=10:90 mol/mol)

216.24 g of aqueous ammonia solution (25% by weight) are mixed with 661.6 g of ethanol (solution A). 3.42 g of titanium(IV) tetraethylate (15 mmol) and 28.41 g of tetraethoxysilane (135 mmol) are dissolved in 763.5 g of absolute ethanol (solution B). Solution A is initially introduced into the reaction vessel, and solution B is added dropwise at 40° C. in the course of 30 minutes. A white precipitate separates out. After the mixture has been stirred for 0.5 hour, it is centrifuged, and the residue is washed with distilled $H_2O$, centrifuged again, washed with isopropanol and centrifuged again. The product is then dried at 60° C. in vacuo.

B

Polycondensation Examples

EXAMPLE 6

Polyethylene terephthalate was prepared in a two-stage process. In the first stage, the transesterification, the reaction of ethylene glycol and dimethyl terephthalate (=DMT) in a molar ratio of 2.5:1 was carried out in the presence of 100 ppm of $ZnAc_2 \cdot 2\ H_2O$ (Ac=acetate) and 150 ppm of $MnAc_2 \cdot 4\ H_2O$, based on the DMT, at temperatures in the range from 165° to 265° C., the continuous increase in temperature from 165° C. to 265° C. being carried out not too quickly in order to avoid sublimation of the DMT. The methanol liberated during the transesterification is distilled off over a column. When the reaction temperature had reached 240° C., 50 ppm of phosphorus, based on the DMT employed, were added as ethyl phosphonoacetate in order to block the transesterification catalysts.

As soon as the reaction temperature of 250° C. was reached, 30 ppm, based on the bis-(2-hydroxyethyl) terephthalate present, of the titanium dioxide/silicon dioxide coprecipitate having the composition of $TiO_2$ [lacuna]= 90:10 mol/mol prepared according to Example 1 were added in the form of a 5% strength by weight suspension in glycol. The polycondensation reaction was carried out at 290° C. under a vacuum of 1.3 mbar. After a reaction time of 112 minutes, a polymer having a relative solution viscosity of 1.595 was obtained. The b* value was 5.5 and the COOH end group content was 15.2 equivalents/$10^6$ g of polymer.

EXAMPLE 7

Polyethylene terephthalate was prepared in a two-stage process. In the first stage, the transesterification, the reaction of ethylene glycol and dimethyl terephthalate was carried out in the presence of 55 ppm of $MnAc_2 \cdot 4H_2O$ or 75 ppm of $MnAc_2 \cdot 2H_2O$, based on the DMT, in a manner otherwise the same as in Example 6. However, the transesterification catalysts were blocked with an equivalent amount of phosphorous acid, which was added in the form of a 70% strength by weight solution in glycol.

At 250° C., 11 ppm, based on the bis-(2-hydroxyethyl) terephthalate present, of the titanium dioxide/ silicon dioxide coprecipitate having the composition of $TiO_2:SiO_2=$ 90:10 mol/mol prepared according to Example 1 were added in the form of a 5% strength by weight suspension in glycol. The polycondensation reaction was carried out at 283° C. under a vacuum of 0.8 mbar. After a reaction time of 180 minutes, a polymer having a relative solution viscosity of 1.605 was obtained. The b* value was 3.7 and the COOH end group content was 13.4 equivalents/$10^6$ g of polymer.

EXAMPLE 8

Example 6 was repeated, with the modification that at 250° C. 28 ppm, based on the bis-(2-hydroxyethyl) terephthalate present, of the titanium dioxide/silicon dioxide coprecipitate having the composition of $TiO_2:SiO_2=90:10$ mol/mol prepared according to Example 1 were added in the form of a 5% strength by weight suspension in glycol. The polycondensation reaction was carried out at 276° C. under a vacuum of 0.5 mbar. After a reaction time of 163 minutes, a polymer having a relative solution viscosity of 1.595 was obtained. The b* value was 4 and the COOH end group content was 15.1 equivalents/$10^6$ g of polymer.

EXAMPLE 9

Example 6 was repeated, with the modification that at 250° C. 100 ppm, based on the bis-(2-hydroxyethyl) terephthalate present, of the titanium dioxide/zirconium dioxide coprecipitate having the composition of $TiO_2:ZrO_2=80:20$ mol/mol prepared according to Example 3 were added in the form of a 5% strength by weight suspension. The polycondensation reaction was carried out at 290° C. under a vacuum of 1.3 mbar. After a reaction time of 174 minutes, a polymer having a relative solution viscosity of 1.643 was obtained. The b* value was 8 and the COOH end group content was 27.0 equivalents/$10^6$ g of polymer.

EXAMPLE 10

Example 6 was repeated, with the modification that at 250° C. 100 ppm, based on the bis-(2-hydroxyethyl) terephthalate present, of the titanium dioxide/zirconium dioxide coprecipitate having the composition of $TiO_2:ZrO_2=90:10$ mol/mol prepared according to Example 2 were added in the form of a 5% strength by weight suspension in glycol. The polycondensation reaction was carried out at 290° C. under a vacuum of 1.3 mbar. After a reaction time of 83 minutes, a polymer having a relative solution viscosity of 1.676 was obtained. The b* value was 10.5 and the COOH end group content was 16.8 equivalents/$10^6$ g of polymer.

EXAMPLE 11

Example 6 was repeated, with the modification that at 250° C. 100 ppm, based on the bis-(2-hydroxyethyl) terephthalate present, of the titanium dioxide/silicon dioxide coprecipitate having the composition of $TiO_2:SiO_2=90:10$ mol/mol prepared according to Example 1 were added in the form of a 5% strength by weight suspension in glycol. The polycondensation reaction was carried out at 290° C. under a vacuum of 1.3 mbar. After a reaction time of 86 minutes, a polymer having a relative solution viscosity of 1.671 was obtained. The b* value was 15.5 and the COOH end group content was 17.0 equivalents/$10^6$ g of polymer.

EXAMPLE 12

Polyethylene terephthalate was prepared in a two-stage process, a direct esterification of terephthalic acid with ethylene glycol to give bis-(2-hydroxyethyl) terephthalate being carried out in the first stage. In the second reaction stage, the polycondensation was carried out using a) 400 ppm of $Sb_2O_3$, b) 100 ppm of $TiO_2/SiO_2$ (90:10 mol/mol) and c) $TiO_2/ZrO_2$ (90:10 mol/mol) as polycondensation catalysts.

a) $Sb_2O_3$ as the Polycondensation Catalyst 1707 g (10.3 mol) of terephthalic acid were heated up in the esterification autoclave together with 1020 g of glycol (16.4 mol) and 1 ppm of defoamer M 10 (from Dow Corning) until an increased pressure of 7 bar had been established by the water split off (235° C. batch temperature). The time this pressure was reached was evaluated as the starting time of the reaction. The increased pressure is maintained for 60 minutes, during which the internal temperature is increased to about 250° C. The water vapour thereby discharged is condensed in the condenser and collected in a measuring cylinder. After a total of 60 minutes, the internal pressure is reduced stepwise to normal pressure in the course of a further 60 minutes (temperature between 250° and 260° C.). The product is then drained into the polycondensation autoclave. Immediately after draining, 50 ppm of phosphorus are added as ethyl phosphonoacetate (EPA) at 240° C. 400 ppm of $Sb_2O_3$, based on the bis-(2-hydroxyethyl) terephthalate present, are then added in the form of a 1.1% strength solution in glycol at an internal temperature of 250° C. (after about 5 minutes). A vacuum programme which reduces the internal pressure to about 1 torr in the course of 25 minutes is then started, with further heating. The internal temperature is regulated by the peak procedure (peak temperature: 298° C.). The reaction end point is determined by measuring the power consumption of the stirrer. After 95 minutes, a product having a solution viscosity of 1.681 is obtained. The carboxyl end group content was 20.1 mmol/kg.

b) $TiO_2/SiO_2$ (90:10 mol/mol) as the Polycondensation Catalyst

Example 12 a) was repeated, with the modification that at 250° C. 100 ppm of $TiO_2/SiO_2$ (90:10 mol/mol), based on the bis-(2-hydroxyethyl) terephthalate present, were added as the polycondensation catalyst in the form of a 5% strength dispersion in glycol. After 82 minutes, a product having a solution viscosity of 1.667 is obtained. The carboxyl end group content was 12.2 mmol/kg, and is thus significantly better than in experiment 12 a).

c) TiO$_2$/SiO$_2$ (90:10 mol/mol) as the Polycondensation Catalyst

Example 12 a) was repeated, with the modification that at 250° C. 100 ppm of TiO$_2$/SiO$_2$ (90:10 mol/mol), based on the bis-(2-hydroxyethyl) terephthalate present, were added as the polycondensation catalyst in the form of a 5% strength dispersion in glycol. After 84 minutes, a product having a solution viscosity of 1.658 is obtained. The carboxyl end group content was 12.1 mmol/kg, and is thus likewise more favourable than in experiment 12 a).

EXAMPLE 13

Post-condensation in the solid phase a) Polycondensation Catalyst Sb$_2$O$_3$

About 2 g of polyethylene terephthalate having a relative solution viscosity (SV) of 1.681 and a carboxyl end group concentration of 20.1 mmol/kg, prepared using 400 ppm of Sb$_2$O$_3$ as the polycondensation catalyst in accordance with Example 12 a), are introduced into a glass tube immersed in a metal bath. Under a continuous stream of nitrogen, the polymer is first kept at 140° C. for one hour (pre-crystallization) and then kept at 231° C. for a further 4 hours. After the post-condensation, the SV was 1.880 and the carboxyl end group content was 11.0 mmol/kg.

b) Polycondensation Catalyst TiO$_2$/ZrO$_2$ (90:10 mol/mol)

About 2 g of polyethylene terephthalate having a relative solution viscosity (SV) of 1.676 and a carboxyl end group content of 16.8 mmol/kg, prepared using 100 ppm of TiO$_2$/ZrO$_2$ (90:10 mol/mol) as the polycondensation catalyst in accordance with Example 10, are introduced into a glass tube immersed in a metal bath. Under a continuous stream of nitrogen, the polymer is first kept at 140° C. for one hour (precrystallization) and then kept at 231° C. for a further 4 hours. After the post-condensation, the SV was 2.037 and the carboxyl end group content was 9.5 mmol/kg.

EXAMPLE 14

Preparation of a Malonate Resin a) Catalyst:Dibutyl-tin Oxide

A 2000 ml five-necked flask which was equipped with a metal stirrer, dropping funnel, nitrogen inlet tube, thermocouple for the internal temperature, a 300 mm long Vigreux silver-jacketed column and a distillation column head was used as the apparatus for this example. The reaction batch comprised the following components:

312.45 g (3 mol) of pentane-1,5-diol as component A, 560.60 g (3.5 mol) of diethyl malonate as component B, 0.87 g (=0.1% by weight, based on A+B) of dibutyl-tin oxide as component C, 43.5 g (15% by weight, based on A+B) of m-xylene as component D, 130.5 g (15% by weight, based on A+B) of xylene as component E.

The dibutyl-tin oxide customary for this reaction was used as the catalyst. Components A, B, C and D were weighed into a flask and the flask was flushed with nitrogen. The mixture was then heated slowly and the first drops of ethanol were distilled off at an internal temperature of 115° C. At a falling rate of distillation, the internal temperature was increased to 200° C. Component E was then additionally added dropwise as an entraining agent for the distillation and removal of the ethanol/m-xylene distillate continued. When the conversion had reached 99.5%, the polycondensation was interrupted. This conversion was achieved after 16 hours. The total amount of distillate at this point in time was 378.03 g. The amount of ethanol distilled off was 274.92 g (theoretical total amount=276.42 g). The Gardner colour number was 13.

b) Catalyst:TiO$_2$/SiO$_2$ (90:10 mol/mol)

The experiment under a) was repeated with the catalyst according to the invention. The reaction batch comprised the following components:

312.45 g (3 mol) of pentane-1,5-diol as component A, 560.60 g (3.5 mol) of diethyl malonate as component B, 0.87 g (=0.1% by weight, based on A+B) of TiO$_2$/SiO$_2$= 90:10 mol/mol as component C, 43.5 g (5% by weight, based on A+B) of m-xylene as component D, 87.0 g (10% by weight, based on A+B) of m-xylene as component E.

Components A, B, C and D were weighed into the flask and the flask was flushed with nitrogen. The mixture was then heated slowly and the first drops of ethanol were distilled off as a mixture with m-xylene at an internal temperature of 142° C. At a falling rate of distillation, the internal temperature was increased to 200° C. Component E was then additionally added dropwise as an entraining agent for the distillation and removal of the ethanol/ m-xylene distillate continued. When the conversion reached 99.8%, the polycondensation was discontinued. This conversion was reached after only 8 hours. The total amount of distillate at this point in time was 342.28 g. The amount of ethanol distilled off was 276.04 g (theoretical total amount of ethanol=276.42 g). The Gardner colour number was 10.

C

Comparison Examples

COMPARISON EXAMPLES 1a and 1b a) An attempt was made to prepare a polyethylene terephthalate analogously to Example 6, in which commercially available titanium dioxides were to function as polycondensation catalysts. For this purpose, after the transesterification carried out in accordance with Example 6 and after blocking of the transesterification catalysts when the reaction temperature reached 250° C., 500 ppm of Hombitec KO 3 TiO$_2$ (a titanium dioxide from Sachtleben), based on the bis-(2-hydroxyethyl) terephthalate present, were added to the reaction batch as the polycondensation catalyst in the form of a 10% strength by weight suspension in glycol. The polycondensation reaction was carried out at 290° C. under a vacuum of 1.3 mbar. After a reaction time of 180 minutes, the experiment was discontinued, since no adequate melt viscosity and therefore no adequate relative viscosity either had been established because the molecular weight of the polycondensation product was too low.

b) A second attempt carried out under the same reaction conditions, in which 500 ppm of Tilcom HPT 3 TiO$_2$ (titanium dioxide from Tioxide), based on the bis-(2-hydroxyethyl) terephthalate present, were added as the polycondensation catalyst in the form of a 10% strength by weight suspension in glycol, proceeded with the same negative result.

COMPARISON EXAMPLE 2

Example 6 was repeated with the modification that at 250° C., 100 ppm, based on the bis-(2-hydroxyethyl) terephthalate present, of the titanium dioxide/silicon dioxide coprecipitate having the composition of $TiO_2:SiO_2=10:90$ mol/mol prepared in accordance with Example 5 were added in the form of a 5% strength by weight suspension in glycol. The polycondensation reaction was carried out at 290° C. under a vacuum of 1.3 mbar. Since still no noticeable increase in the melt viscosity had occurred after a reaction time of 180 minutes, the experiment was discontinued.

COMPARISON EXAMPLE 3

Example 6 was repeated with the modification that at 250° C., 100 ppm, based on the bis-(2-hydroxyethyl) terephthalate present, of the titanium dioxide/zirconium dioxide coprecipitate having the composition of $TiO_2:ZrO_2=60:40$ mol/mol prepared in accordance with Example 4 were added in the form of a 5% strength by weight suspension in glycol. The polycondensation reaction was carried out at 290° C. under a vacuum of 1.3 mbar. Since, still no noticeable increase in the melt viscosity had occurred after a reaction time of 180 minutes, the experiment was discontinued.

COMPARISON EXAMPLE 4

Example 7 was repeated with the modification that at 250° C., 340 ppm of $Sb_2O_3$, based on the bis-(2-hydroxyethyl) terephthalate present, were added. The polycondensation reaction was thus carried out at 283° C. under a vacuum of 0.8 mbar. After a reaction time of 180 minutes, a polymer having a relative solution viscosity of 1.590 was obtained. The b* value was 4.8 and the COOH end group content was 22.5 equivalents/$10^6$ g of polymer.

This comparison example shows in particular that the catalytic activity of the catalysts used according to the invention is considerably higher than that of $Sb_2O_3$, and with the former it is therefore possible to achieve the same polycondensation times as when $Sb_2O_3$ is used by considerably reducing the amount of catalyst employed, and—if the colour values of the thread-forming polyesters are important for certain uses—also to achieve practically the same b* values (Examples 6, 7, and 8).

COMPARISON EXAMPLE 5

Example 6 was repeated with the modification that at 250° C., 213 ppm of titanium tetrabutylate, based on the bis-(2-hydroxyethyl) terephthalate present, were added as the polycondensation catalyst in the form of a 5% strength by weight solution in glycol. The polycondensation reaction was carried out at 290° C. under a vacuum of 3.5 mbar. After a reaction time of 134 minutes, a polymer having a relative solution viscosity of 1.633 was obtained. The b* value was 15.5 and the COOH end group content was 20.2 equivalents/$10^6$ g of polymer.

This comparison example shows in particular that although titanium tetrabutylate has a higher catalytic activity than $Sb_2O_3$ at a significantly poorer b* value, it has to be employed in a higher concentration than the catalysts used according to the invention to achieve comparatively short polycondensation times.

What is claimed is:

1. Process for the preparation of polyesters and copolyesters by polycondensation of polyester-forming starting components, esters or oligoesters being prepared in a first reaction stage and subjected to polycondensation in a second reaction stage in the presence of titanium catalysts, wherein, in the polycondensation stage, at least one of a titanium dioxide/silicon dioxide coprecipitate having a composition of $TiO_2:SiO_2=90:10$ to 20:80 mol/mol and a titanium dioxide/zirconium dioxide coprecipitate having a composition of $TiO_2:ZrO_2=95:5$ to 70:30 mol/mol, which at least one coprecipitate is obtained by hydrolytic precipitation of metal alcoholates corresponding to each component of the coprecipitate and formed from monohydric or polyhydric alcohols, is employed as the polycondensation catalyst for polycondensation of the esters or oligoesters.

2. Process according to claim 1, wherein at least one of a titanium dioxide/silicon dioxide coprecipitate having a composition of $TiO_2:SiO_2=90:10$ to 50:50 mol/mol and a titanium dioxide/zirconium dioxide coprecipitate having a composition of $TiO_2:ZrO_2=90:10$ to 80:20 mol/mol is employed as the polycondensation catalyst.

3. Process according to claim 1, characterized in that said at least one coprecipitate is employed in a total amount of 5 to 500 ppm, based on the esters or oligoesters to be subjected to polycondensation.

4. Process according to claim 3, wherein said at least one coprecipitate is employed in a total amount of 10 to 100 ppm, based on the esters or oligoesters to be subjected to polycondensation.

5. Process according to claim 1, wherein said at least one coprecipitate is added in the form of a 5 to 20% strength by weight suspension in glycol to the esters or oligoesters to be subjected to polycondensation before their polycondensation.

6. Process according to claim 1, wherein any transesterification catalysts present from the first reaction stage are blocked by additional addition of at least one phosphorus-containing blocking agent.

7. Process according to claim 6, wherein at least one of carbethoxy-methyl-diethyl phosphonate, di(polyoxyethylene)hydroxy-methyl phosphonate, tetraisopropyl methylene-diphosphonate and $H_3PO_4$ are employed as the blocking agent.

8. Process according to claim 1, wherein alkyd resins having a relative molecular weight<10,000 are prepared.

9. Process according to claim 1, wherein saturated polyester resins having a relative molecular weight<10,000 are prepared.

10. Process according to claim 1, wherein polyester and copolyester precursors for polyurethanes are prepared, said precursors having a relative molecular weight<10,000.

11. Process according to claim 1, wherein thermoplastic polyesters and copolyesters having a relative molecular weight>10,000 are prepared.

12. Process according to claim 11, wherein a member selected from the group consisting of polyethylene terephthalate, polybutylene terephthalate, poly(ethylene 2,6-naphthalene-dicarboxylate), poly-(butylene 2,6-naphthalene-dicarboxylate), poly(1,4-dimethylenecyclohexane terephthalate) and copolyesters thereof based on high homopolyester contents of at least 80 mol per cent, is prepared.

13. Process according to claim 11, wherein polyetheresters are produced.

14. Process according to claim 1, wherein completely aromatic or liquid-crystalline polyesters are produced.

* * * * *